United States Patent [19]

Andersson

[11] Patent Number: 4,808,863
[45] Date of Patent: Feb. 28, 1989

[54] ACTIVE CONTROL SYSTEM AND METHOD FOR REDUCING ENGINE NOISE AND VIBRATION

[75] Inventor: Anders O. Andersson, Seattle, Wash.

[73] Assignee: The Boeing Company, Seattle, Wash.

[21] Appl. No.: 73,617

[22] Filed: Jul. 15, 1987

[51] Int. Cl.⁴ .................... F16F 15/03; G05D 19/00; H02P 15/00; H02K 7/00

[52] U.S. Cl. .................... 310/51; 180/312; 318/629

[58] Field of Search .............. 180/300, 312; 188/267, 188/299; 248/550; 310/51, 91; 318/114, 460, 605, 629

[56] References Cited

U.S. PATENT DOCUMENTS

| | | | |
|---|---|---|---|
| 3,088,062 | 4/1963 | Hudimac | 188/267 |
| 4,121,143 | 10/1978 | Halbermann et al. | 318/629 |
| 4,538,697 | 9/1985 | Muroi et al. | 180/300 |
| 4,600,863 | 7/1986 | Chaplin et al. | 318/114 |
| 4,626,754 | 12/1986 | Halbermann et al. | 318/629 |
| 4,699,348 | 10/1987 | Freudenberg | 188/267 |

FOREIGN PATENT DOCUMENTS

| | | | |
|---|---|---|---|
| 144231 | 8/1983 | Japan | |
| 100687 | 12/1983 | Japan | 318/114 |

*Primary Examiner*—Patrick R. Salce
*Assistant Examiner*—D. L. Rebsch
*Attorney, Agent, or Firm*—Conrad O. Gardner; B. A. Donahue

[57] ABSTRACT

Noise and vibration in a structure is reduced through application to the structure of an oscillatory torque. An electromechanical energy converter provides the oscillatory torque when the input signal to the electromechanical energy converter has a frequency and harmonics thereof required to counteract the noise and vibration desired to be attenuated.

1 Claim, 1 Drawing Sheet

ACTIVE CONTROL SYSTEM AND METHOD FOR REDUCING ENGINE NOISE AND VIBRATION

BACKGROUND OF THE INVENTION

The invention relates to systems for controlling noise and vibration and more particularly to an active control system for reducing engine noise and vibration which includes a rotating electromechanical energy converter output device. Control of a vibrating body has previously been accomplished in the prior art by detection of the vibration and application of a force against the detected vibration as seen in, e.g., Japanese Patent No. 58-144231. In order to provide active noise and vibration control, a multitude of vibration generators is required. As a consequence, the weight of these devices becomes appreciable and undesirable, even more particularly so in aircraft applications.

In a conventional shaker, a force is applied to the structure by reaction against an accelerating mass. The force is the product of the mass and the acceleration. In order to limit the displacement of the mass (which is proportional to the acceleration) the mass cannot be reduced below some limits set by the practicality of the suspension of the mass.

Accordingly, it is an object of the present invention to remove the aforementioned constraint on mass reduction in vibration generator design.

In accordance with a first embodiment of the invention, an electric motor is provided with its stator rigidly attached to the structure to be vibrated. An input current is applied through the windings which input current is modulated in proportion to the desired torque in order to vibrate the structure by application of an oscillatory torque.

A further embodiment of the present invention utilizes a fast spinning rotor which is braked electrically with a modulated current to produce the oscillatory torque.

These and other objects and advantages of the present invention are specifically set forth in or would become apparent from the following detailed description of preferred embodiments of the invention when read in conjunction with the accompanying drawings in which:

DESCRIPTION OF THE PREFERRED EMBODIMENTS

Figure 1:
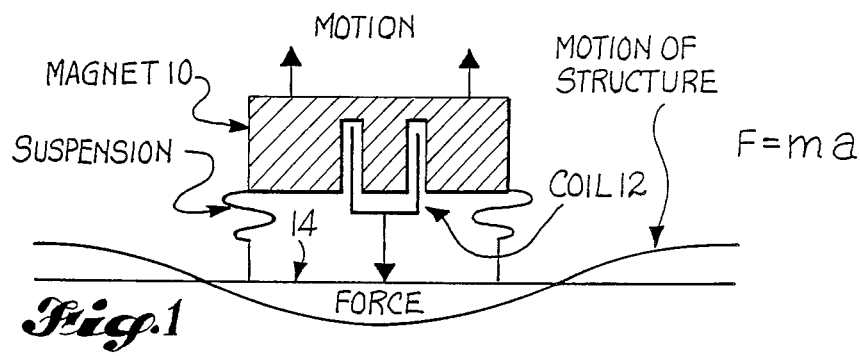
FIG. 1 is a diagrammatic view of prior art conventional shaker force to a structure by reaction against an accelerating mass.

Turning now to FIG. 1 it can be seen how a magnet 10 for energizing a coil 12 has been utilized heretofore to provide an oscillatory force for providing linear acceleration and displacement of a structure 14. In this system configuration the force F applied to the structure 14 is equal to the mass of the magnet 10 times the linear acceleration of the magnet 10.

Figure 2:
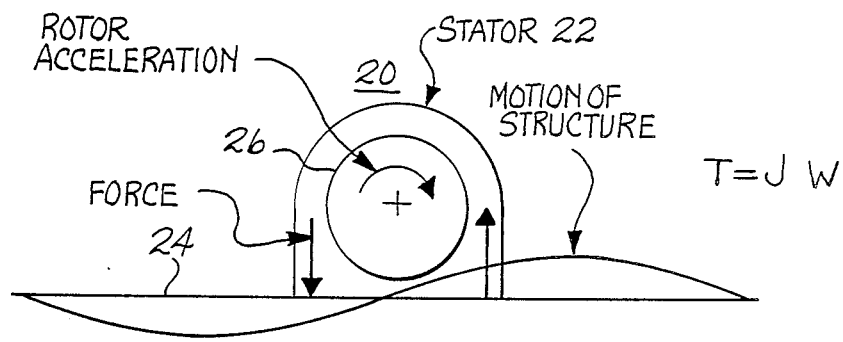
FIG. 2 is a diagrammatic view of a first embodiment of the present invention wherein a rotary machine is utilized to provide an oscillatory torque instead of an oscillatory force as in a conventional vibrator shown in FIG. 1; and, FIG. 3 is a diagrammatic and schematic view of an active control system in accordance with a further embodiment of the present invention wherein the electromechanical energy conversion device comprises a rotating disc for providing an oscillatory torque in response to the input modulated current or desired force signal containing the fundamental and multiple frequencies of the shaft rotation speed of the engine.

In the present active control system and method for reducing engine noise and vibration as shown in the first embodiment of FIG. 2, a rotating machine 20 has its stator 22 rigidly attached to the structure 24 to be vibrated while the input current through the windings of either stator 22 or rotor 26 is modulated in proportion to the desired torque. In the case of rotating machine 20 it can be seen that angular acceleration and displacement takes the place of linear acceleration and displacement provided by the magnet 10 and coil 12 combination of FIG. 1. Since angular acceleration and displacement then take the place of linear acceleration and displacement, the angular displacement (rotation) can be unlimited without placing difficult requirements on the suspension of the rotor, which can be contrasted to the system of FIG. 1 having such limitation. Rotor 26 of rotary machine 20 is given a steady rotation speed in the absence of a modulating current applied to rotor 26 or stator 22. In this manner drive friction in the bearings is avoided. Advantageously in this electromechanical energy conversion embodiment of the present system, a substantial part of the device's mass, such as a permanent magnet, may be placed in the rotor.

Figure 3:
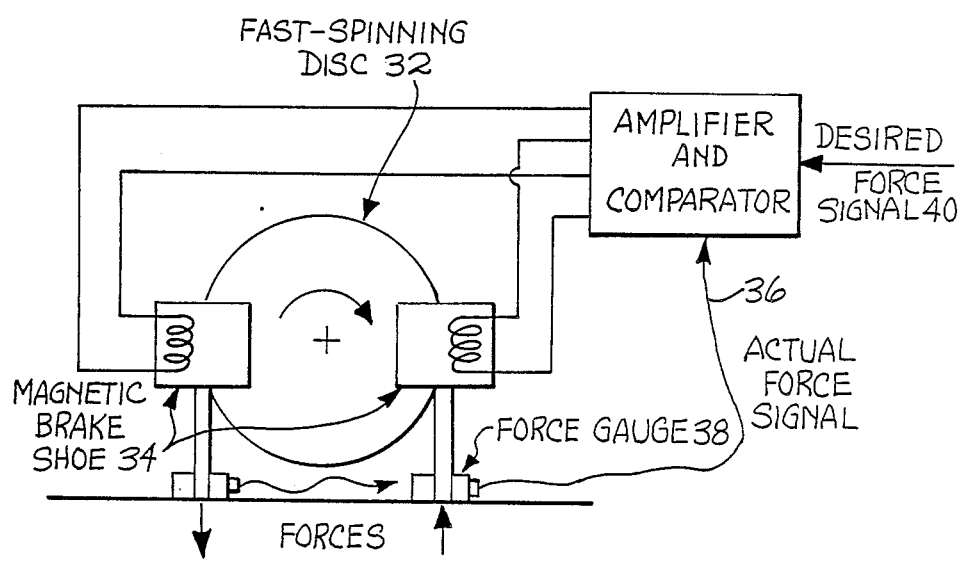

In the second embodiment system implementation shown in FIG. 3 an electromechanical amplifier is utilized, thereby reducing the size and weight of the electrical amplifier utilized to drive the rotary machine. In accordance with this principle a fast spinning rotor comprising disc 32 is braked electrically with the modulation input current to produce the oscillatory torque. The advantage of this embodiment is that a large amount of mechanical energy is stored in the disc 32 and is converted to vibratory energy as needed based upon the modulated current input. While braking then may be done mechanically with brake shoes, better control is achieved through electrical braking by magnetic brake shoes 34. The control current in the embodiment of FIG. 3 passing through the two or more magnetic brake shoes 534 is modulated to produce eddy currents in disc 32 of the rotary machine of FIG. 3. The control current passing through magnetic brake shoes 34 is regulated by feedback input 36 from the magnetic brake shoe force gauges 38 to produce the required torque.

In aircraft vibrations occur at the shaft-rotation speed of the engine and multiples thereof. In conventional jet engines the dominating frequency or fundamental is the shaft-rotation frequency itself which occurs in the range from 35 Hz to 65 Hz. In Propeller aircraft the shaft-rotation frequency is lower, viz. in the range of 20-25 Hz. However the multiple of the fundamental frequencies or the harmonic frequencies are important in noise and vibration reduction and therefore harmonic frequencies up to 800 Hz may require suppression. Large turbines and diesel engines require suppression of frequencies in the range of 10 to 1000 Hz while helicopter rotor frequencies requiring attenuation may be found below 10 Hz.

The present active control system embodiments of the invention may be utilized to create a force containing all the frequencies to be reduced simultaneously. The composite or input signal which is utilized in the present system embodiments contains the fundamental frequency and harmonic frequency components desired to be suppressed. In the embodiment of FIG. 3 the input signal containing the fundamental and harmonic frequencies provides desired force signal 40. The same input signal may be provided in the embodiment of FIG. 2 to the rotor 26 or stator 22 as hereinbefore described.

Described embodiments of the present invention will enable those skilled in the art to practice further embodiments of the present invention without departing from the spirit and scope of the invention.

What is claimed is:

1. A system for generating vibratory energy comprising in combination:

an electrical amplifier for driving a rotary machine comprising a disk;

a plurality of magnetic brake shoes coupled to said disk;

means including an electromechanical amplifier for reducing the size and weight of said electrical amplifier driving said rotary machine;

said electrical amplifier coupled to said plurality of magnetic brake shoes for providing a modulated current through said plurality of magnetic brake shows thereby producing eddy currents in said disk; and, magnetic brake shoe force gauge means for providing feedback input to regulate the control current passing through said plurality of magnetic brake shoes to produce a required torque.

* * * * *